June 26, 1934. H. ALFARO 1,964,418
AIRPLANE
Original Filed Dec. 19, 1927

Inventor
Heraclio Alfaro
Evans & McCoy
By Attorneys

Patented June 26, 1934

1,964,418

UNITED STATES PATENT OFFICE 1,964,418

AIRPLANE

Heraclio Alfaro, Cambridge, Mass.

Application December 19, 1927, Serial No. 240,981
Renewed January 24, 1933

9 Claims. (Cl. 244—29)

This invention relates to airplanes, and more particularly to the lateral control or rolling control of airplanes.

To obtain effective rolling control in airplanes peculiar difficulties are encountered, especially when flying at low speeds or during stalled flight. Thus, in landing, or when cautious flying is required, the speed must be reduced to a minimum and at these times a responsive all around control of the aircraft is most desirable.

For flying at low speed, the flying angle must be increased and the orthodox type of ailerons is not suitable under these circumstances because it is not as responsive as desirable when the machine is flying at angles close to that of maximum lift. In some such cases the response of the machine is even reversed and in all cases, a difference of drag between the right side and the left side of the wings is created, which is most undesirable for easy maneuvering and requires the use of the rudder in combination with the banking or rolling controls. In heavy airplanes, these controls are hard to operate and require considerable effort on the part of the pilot.

An object of this invention is to provide responsive rolling control for airplanes which is particularly useful when flying at very low speeds.

Another object of my invention is to obtain effective rolling control in airplanes flying at large angles of attack and also during stalled flight.

A further object of the invention is to provide a rolling control for airplanes, which is free from the undesirable difference in the drag of each side of a wing and the above mentioned reverse action inherent in the types of control heretofore used.

Another object of this invention is to provide an effective rolling control for large airplanes requiring a relatively small effort on the part of the pilot in operating said control.

Still another object of the invention is to provide an efficient rolling control system for airplanes that will require no exposed irregularities (nor gaps when in normal position) between the body of an airfoil and the moving surfaces used for control.

Other objects of the invention will be apparent to those skilled in the art from the description of it hereafter given.

In the drawing, Figure 1 is a perspective view of an airfoil provided with the rolling control contemplated by my invention.

Figure 1:
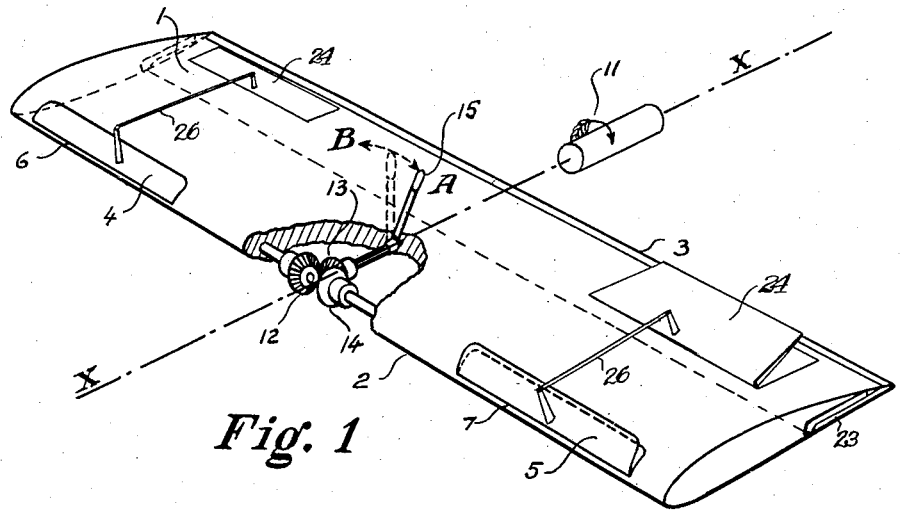

My invention contemplates the provision of a highly effective rolling control for airplanes. I have found that the use of a rolling control device near the leading edge of an airfoil is particularly advantageous, especially when the airplane is flying at low speeds, or at high angles of attack, and also when the airplane stalls or is nearing a stall.

I have furthermore found it advantageous to use rolling control surfaces that will furnish the necessary rolling action by reducing the lift of whichever side of an airfoil is necessary, to obtain the desired rolling motion. By so doing, I have found that the yawing moment created by the action of the rolling control is conductive to easy maneuvering and makes it unnecessary to use the rudder in many cases.

Moreover, I have found that the proposed arrangement allows free use of flaps or other auxiliary devices mounted near the trailing edge of the airfoil when desired, without interfering with the proper action of said rolling controls.

I found also that when the proposed rolling control surfaces are hinged close to the leading edge, the controlling action is very satisfactory and is very consistent in its effect throughout the range of angles of flight of an ordinary airplane, except when the angle of attack is small and the angles of the proposed deflectors are also small.

I have also found that the present invention makes it possible to provide a satisfactory rolling control for large airplanes which requires for its manipulation a relatively small effort on the part of the pilot.

A further advantage of my invention is that it permits effective rolling control when the airfoil meets the air at maximum lift angles and even at larger angles than that of maximum lift as, for instance, during a stall or during a tail spin.

This invention can be applied to airfoils or airplane wings of any type and to any combination of wings or airfoils.

There is illustrated in the drawing an airfoil 1 which may represent the lifting means of an airplane. The axis, X—X, runs approximately parallel to the direction of flight and its direction is such that the air strikes first the leading edge 2 and leaves the airfoil at its trailing edge 3.

The rolling control mechanism of this invention includes auxiliary surfaces in the form of deflectors 4 and 5 which may, when desired, extend throughout the entire span of the airfoil but which I prefer to locate near the airfoil tips along a portion only of the span as shown in Fig. 1, these deflectors being hinged near the leading edge of the airfoil at 6 and 7. During normal operation of the plane, it is advantageous to maintain the deflector surfaces flush with the outer skin of the airfoil but when rolling action is necessary for control, one of these deflectors is pushed outwardly by means of an actuating rod 8 pivoted thereto and actuated by a cam 9 engaging rollers 16 and 17 carried by the rod. I prefer to build the deflectors 4 and 5 so that the outside faces thereof follow closely the shape of the airfoil selected. Cam 9 is rotated by a torque member 10 which is connected to the control lever 15 as will be hereinafter more fully explained. It is preferable to arrange the cams so that when the lever 15 is actuated, the deflector at one end only will be operated, the other deflector remaining in neutral position.

The lower face of the airfoil from the hinges of the control deflectors rearwards is uniform and should conform under all circumstances to the shape of the original airfoil section selected. It is also desirable not to have any openings near the hinge.

I prefer to locate the hinges of the control deflectors near the outer skin of the airfoil and relatively close to the leading edge of the airfoil.

The effect of moving one of these deflectors upwards is to reduce the lift of the portion of airfoil behind it over a region somewhat larger than the width of the deflector surface.

A variation in the lift on one side of the axis of the airfoil only, will naturally cause a rolling motion, about said axis. Fig. 1 shows deflector 5 in operative position and, as explained above, the lift of the portion of wing behind is reduced so that the airfoil tends to roll in a clockwise direction as shown by arrow 11. It will be obvious that reverse actuation on the deflectors will cause an opposite rolling motion.

Torque member 10 can be operated by the pilot to selectively actuate the deflectors 5 and 6 by means of bevel gears 12, 13, 14 and the lever 15. The position shown for deflector 5 corresponds to the full line lever position A as shown. For a reverse action, the lever should be pushed toward B, the dotted line being the normal position of the lever.

Figure 2:
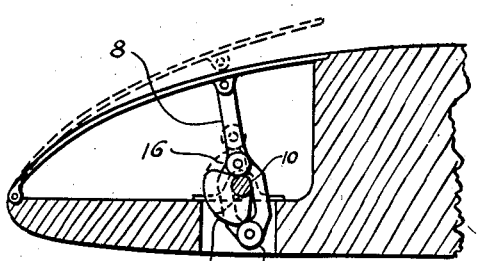
Fig. 2 shows a section of the auxiliary controlling surface and the suggested linkage between the pilot's control and the auxiliary controlling surfaces.

In Fig. 2 the parts are shown in full lines in normal position and dotted lines show the positions of the cam 9, the roller 10 and the control deflector 4, when the controlling system is in operation.

In some cases it may be advantageous to use small ailerons in combination with the nose deflectors for lateral control. As said before, the nose deflector may be ineffective at small angles of attack and a set of small ailerons, which are most effective at small angles of attack and are of negligible effect at wide angles of attack, are placed in one face only of the wing to furnish satisfactory control under such circumstances. In case flap is used, the small ailerons can be placed forward of the flap so that they will not interfere with its operation as particularly shown in Fig. 3. In this structure the same cam 9 that controls the nose deflector 5, for instance, also serves to control the ailerons.

Figure 3:
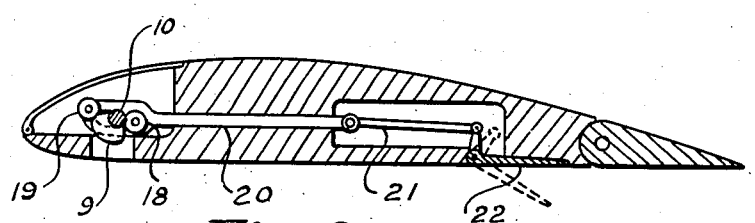
Fig. 3 shows in section a nose deflector in combination with auxiliary ailerons for use on wings having a full span flap.

As shown in Fig. 3 of the drawing, certain cams 9 on the shaft 10 are engaged by rollers 18 and 19 carried by rods 20 which are connected by links 21 to ailerons 22. Rotation of the shaft 10 in a counter clockwise direction from a position shown in Figs. 2 and 3 actuates the aileron 22 while the deflector is held in inoperative position.

Figure 4:
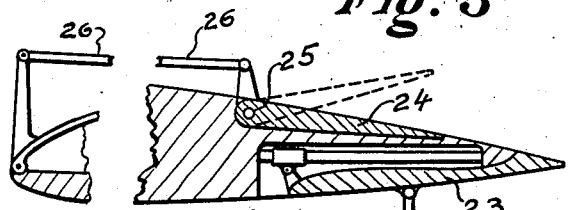
Fig. 4 shows a transverse section of an airfoil with parts broken away and illustrating a modified application of the invention.

In Fig. 4, there is shown an aileron 24 upon the top of the airfoil pivoted at 25 and connected by the link 26 to the deflector for simultaneous actuation therewith.

With my improved rolling control system installed in the above described relations upon an airplane, control during slow flying or stalled flight is made easy and danger of side slipping or losing control is eliminated. Also, the relatively small size of those controlling elements and the load distribution of the air pressure upon them makes possible an easy handling of the controls on a large machine. Uneven drag of the wing or wings introduced by use of this control tends to slow down the wing whose lift is reduced, favoring therefore the negotiation of a bank and a turn at the same time with little or no rudder action, and also making it easier for a pilot to bring the plane out of tail spins and to perform other maneuvers safely. When flaps or other auxiliary devices are used near the trailing edge of a wing, this invention permits the use of such flaps or devices along the complete span with no conflict or interference. For example, as shown in Fig. 4, the airfoil may have a whole span flap 23 of the pivoted sliding type such as disclosed in my Patent No. 1,837,186 granted December 22, 1931, and the ailerons and trailing flap, although both adjacent the trailing edge of the airfoil, are independently operable. Likewise, the necessity for differential gears to obtain rolling control when using flaps or other auxiliary devices near the trailing edge of wings is eliminated.

It will thus be seen that I have provided advantageous means of rolling control for airplanes with different types of wing construction, whereby said airplanes may possess responsive rolling control in any flying condition.

Furthermore, it is understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. An airfoil having a portion of its upper surface adjacent each end formed by a deflector hinged adjacent its forward edge to swing about an axis extending along the leading edge of the airfoil, a pivoted aileron mounted rearwardly of each of said deflectors for movement from a position in which its outer surface forms a part of the airfoil surface to a position in which the aileron projects outwardly from the airfoil surface, an actuating member for each of said deflectors, means operable by each of said members upon movement of the member in one direction to swing one of the deflectors outwardly from the airfoil surface, and means operable by the member upon movement of said member in the opposite direction to swing the aileron at the same end of the airfoil outwardly from the airfoil surface.

2. An airfoil having a portion of its upper surface adjacent each end formed by a deflector hinged adjacent its forward edge to swing about an axis extending along the leading edge of the airfoil, a pivoted aileron mounted rearwardly of each of said deflectors for movement from a position in which its outer surface forms a part of the airfoil surface to a position in which the aileron projects outwardly from the airfoil surface, an actuating member for each of said deflectors, means operable by each of said members upon movement of the member in one direction to swing one of the deflectors outwardly from the airfoil surface, means operable by the member upon movement of said member in the opposite direction to swing the aileron at the same end of the airfoil outwardly from the airfoil surface, and means for simultaneously imparting movement to said actuating members in opposite directions.

3. An airfoil having a portion of its upper surface adjacent each end formed by a deflector hinged adjacent its forward edge to swing about an axis extending along the leading edge of the airfoil, a pivoted aileron mounted rearwardly of each of said deflectors for movement from a position in which its outer surface forms a part of the airfoil surface to a position in which the aileron projects outwardly from the airfoil surface, and means for simultaneously actuating the deflector adjacent either end of airfoil and the aileron adjacent the opposite end thereof.

4. An airfoil having a portion of its upper surface adjacent each end formed by a deflector hinged adjacent its forward edge to swing about an axis extending along the leading edge of the airfoil, an actuating shaft for each deflector mounted within the airfoil adjacent the leading edge thereof, means operated by each of said shafts upon rotation of the shaft in a given direction from a neutral position for imparting an upward movement to its deflector, gearing connecting said shafts and constraining the same to rotation in opposite directions, and means for actuating said gearing in either direction to selectively operate said deflectors.

5. An airfoil having a portion of its upper surface adjacent each end formed by a deflector hinged adjacent its forward edge to swing about an axis extending along the leading edge of the airfoil, a pivoted aileron mounted rearwardly of each of said deflectors, an actuating shaft for each deflector mounted within the airfoil adjacent the leading edge thereof and disposed parallel with the pivotal axis of the deflector, actuating members connected to said deflectors and ailerons, and cams on said shafts engaging said actuating members.

6. An airfoil having a flap at its trailing edge and a portion of its upper surface formed by a deflector hinged adjacent its forward edge to the airfoil to swing about an axis extending along the leading edge of the airfoil, a lateral control aileron mounted rearwardly of the deflector on the under side of the airfoil forwardly of said flap, and means for simultaneously actuating said deflector and aileron.

7. An airfoil having a whole span flap at its trailing edge which has its forward edge pivotally and slidably connected to the airfoil, and a relatively small independently actuated swinging lateral control aileron forming part of the upper surface of the airfoil and overlapping said flap.

8. An airfoil having a pivoted whole span flap at its trailing edge mounted to swing downwardly with respect to the body of the airfoil, said airfoil formed with a pocket in its upper surface overlapping said flap, a roll control surface mounted in said pocket and normally forming a part of the airfoil surface, pivoted adjacent the forward edge of said pocket and swingable upwardly to extend above the wing surface.

9. An airfoil having a pivoted whole span flap at its trailing edge mounted to swing downwardly with respect to the body of the airfoil, said airfoil formed with a pocket in its upper surface overlapping said flap, a roll control surface mounted in said pocket and normally forming a part of the airfoil surface and projectable outwardly to extend above the wing surface for roll control.

HERACLIO ALFARO.